(No Model.) 2 Sheets—Sheet 1.

J. C. LOVE.
INSULATOR FOR ELECTRICAL CONDUCTORS.

No. 392,127. Patented Oct. 30, 1888.

Fig. X.

Witnesses:
John Revell
Geo. A. Crane

Inventor:
J. C. Love,
By his Attys Howson and Howson (No Model.) 2 Sheets—Sheet 2.

J. C. LOVE.
INSULATOR FOR ELECTRICAL CONDUCTORS.

No. 392,127. Patented Oct. 30, 1888.

Witnesses:
John Revell,
Geo. A. Crane.

Inventor:
J. C. Love.
By his Attys Howson and Howson

UNITED STATES PATENT OFFICE.

JOHN C. LOVE, OF PHILADELPHIA, PENNSYLVANIA.

INSULATOR FOR ELECTRICAL CONDUCTORS.

SPECIFICATION forming part of Letters Patent No. 392,127, dated October 30, 1888.

Application filed July 10, 1888. Serial No. 279,535. (No model.)

*To all whom it may concern:*

Be it known that I, JOHN C. LOVE, a citizen of the United States, residing in Philadelphia, Pennsylvania, have invented certain Improvements in Insulators for Electrical Conductors, of which the following is a specification.

My invention consists of an improved means of insulating electrical line-conductors, more particularly in underground conduits, and of securing the conductors therein.

My invention is especially designed for mounting electrical conductors in conduits for electrical railways; but my improvements may be applied to other uses.

Figure 2:
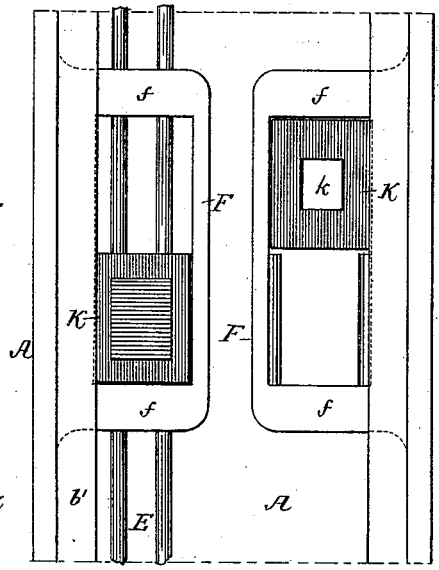
Figure 1:
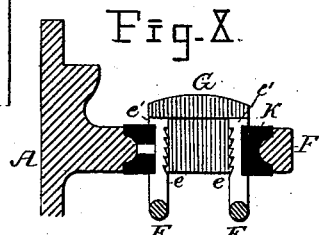
Figure 1:
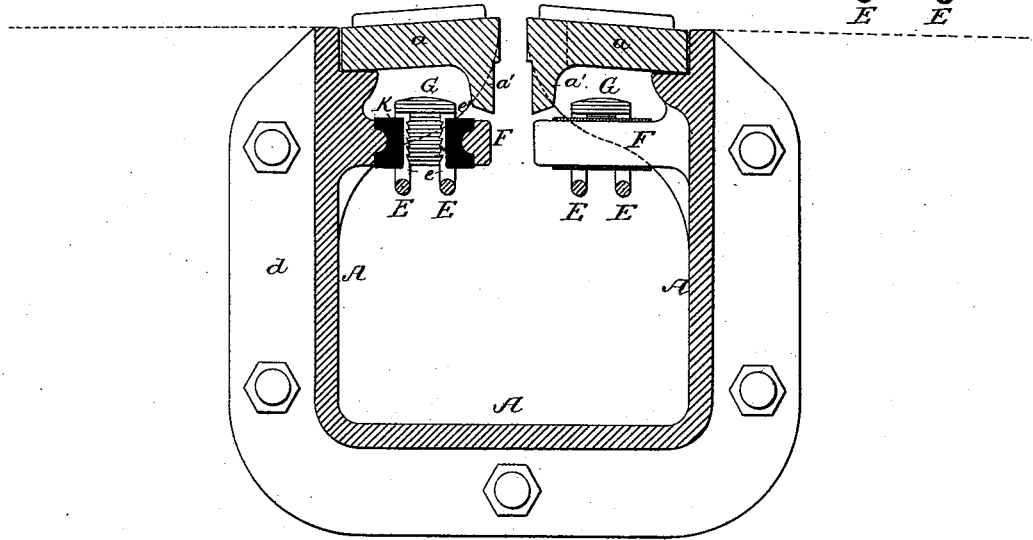
Figure 3:
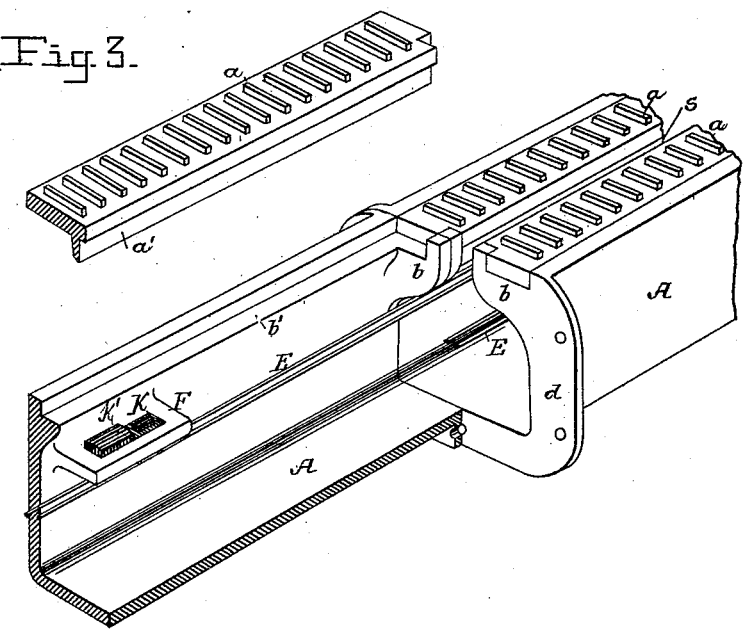
Figure 4:
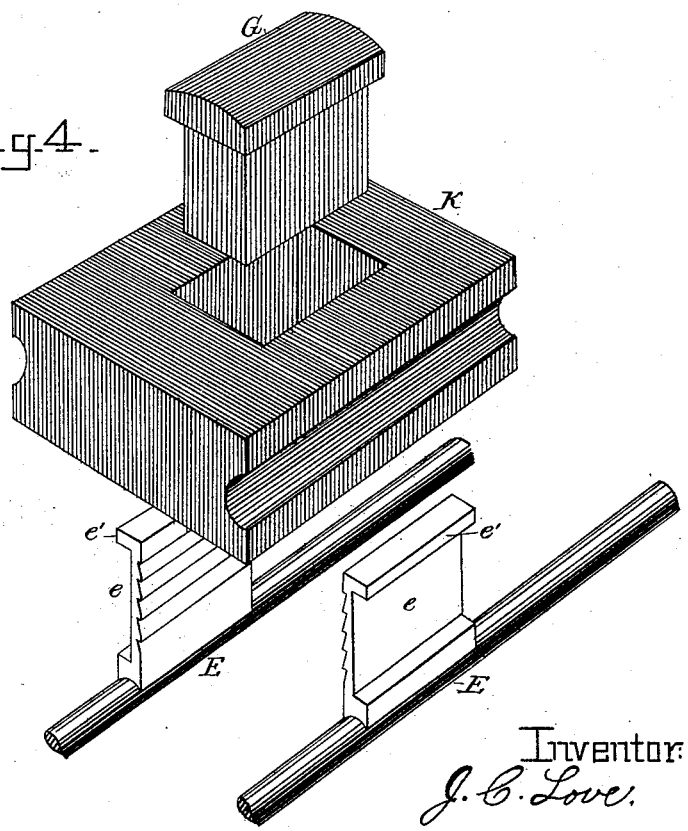

In the accompanying drawings, Figure 1 is a transverse section of an underground conduit in which electrical conductors are secured or mounted and insulated in accordance with my invention. Fig. 2 is a plan of a part of a conduit-section with the top plates removed. Fig. 3 is a perspective view of the united ends of two conduit-sections, one being shown in sectional view. Fig. 4 is a perspective view of my insulating and mounting devices shown separately; and Figs. 5, 6, 7, and 8 are views of modifications.

In the drawings I have shown the conduit as made in trough-shaped sections A, with open tops closed by cover-pieces a, resting on suitable end brackets, b, and longitudinal flanges b' on the body of the conduit. These cover-pieces are so mounted on the trough-sections as to leave a central continuous slot, s, between them for the passage of the contact-carriers on the cars of the railway. The adjacent edges of the covers a preferably have pendent flanges a'. The sections of the conduits may be united by bolting together their flanged ends d. I do not, however, wish to restrict myself to the special form of conduit shown and described, as that may be varied without departing from the main feature of my invention, which relates more particularly, as I have said, to the means for mounting or stringing and insulating the electrical conductors in the conduit. In these drawings I have shown four of these electrical conductors E—two on each side of the central slot; but I do not wish to restrict myself to any special number of the conductors, as they will vary with the requirements of the road.

Figure 5:
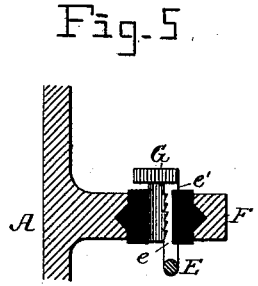
Figure 6:
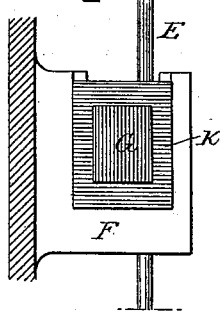
Figure 7:
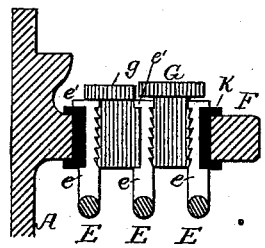

In the modifications Figs. 5 and 6, for instance, I have shown how a single conductor may be mounted in accordance with my invention, while in Fig. 7 three conductors are shown mounted together.

Where conductors are to be mounted on both sides of the conduit, I form in one piece with the conduit itself, or affix thereto, a series of projecting yokes or holding-jaws, F, at suitable intervals on each side wall of the conduit. The simplest form of the yoke or jaw F is illustrated in the plan view, Fig. 6, where it is shown as with an open end for the insertion of the insulating-block K. I prefer, however, in practice to extend the jaws to more than twice the length of the insulating-block K, as shown in Fig. 2, and to close the end $f$ of the jaw for purposes of strength, and also to permit of the insertion of a retaining-plug, $k'$, as indicated in Fig. 3, when desired, after the wires have been strung.

The outer edges of the block K are preferably grooved, as shown at Figs. 1, 4, and 6, for instance, to fit corresponding ribs on the jaws, in order to hold the block in position vertically. In the modification Fig. 6 the inner faces of the jaws themselves form the holding-ribs. In the modification Fig. 5 I have shown the ribs on the blocks and the jaws as grooved; but I do not prefer this construction.

The block K, which may be formed of glass or other suitable insulating material, has formed through it an opening, $k$, Fig. 2, which in this instance I have shown as rectangular, but which may be of any suitable shape. This opening is for the reception of a tongue, $e$, on each conductor E, which is to be retained in this holding-block. The tongue $e$ may be brazed, riveted, or otherwise secured to its conductor, and it is formed at its free end with a hook or projection, $e'$, which engages with the upper edge of one side of the opening in the block, as shown in Figs. 1, 4, and 5. The tongue is then held in place by a key, G, of insulating material, inserted in the opening in the block behind the tongue. Where two conductors are to be secured in one insulating-block, their respective tongues are arranged at opposite sides of the opening $k$ and the key G is inserted between them.

Where three conductors are to be secured in one insulating-block, as shown in Fig. 7, for instance, first one tongue e is inserted in the block and an insulating or filling piece, g, inserted, and then two other tongues e of the two remaining conductors are inserted and secured by an intermediate key, G, of insulating material. The tongue of the central conductor in this case has a projection or hook, e', to engage with the key g first inserted. I preferably roughen or serrate the backs of the tongues e where the keys come in contact with them, and these keys may be formed of rubber, vulcanized fiber, or other suitable material, which by engagement with these teeth will be prevented from working out. After the conductor-tongues have been secured in the blocks in the jaws the blocks may be keyed up in the jaws, if the latter have closed ends, by the insertion of wedges k', as shown in Fig. 3; but this I do not regard as essential. Where it is desired to use one of the conductors as a common return-wire for two or more of the other conductors and the return-conductor has not capacity for the total return-current, the conduit or ground may be used to carry a portion of the return-current by connecting the return-conductor therewith electrically. As a convenient means of accomplishing this, I form on or connect to the tongues of the conductors pins p, which are passed through openings in the sides of the insulating-blocks and make contact with the conduit, as shown in Fig. 8.

I claim as my invention—

1. The combination of an insulating-block having an opening through it and a support for the block with an electrical line-conductor having a tongue to enter the said opening, and a key to secure the tongue, substantially as described.

2. The combination of an insulating-block having an opening through it and a support for the block with an electrical line-conductor having a tongue with a hook to enter said opening and engage with the block, and a key to secure the tongue, substantially as described.

3. The combination of a conduit having jaws, insulating-blocks having openings in them and held in the jaws with electrical conductors having tongues to enter the openings in the blocks, and keys to secure the tongues in place, substantially as described.

4. The combination of a conduit having jaws, insulating-blocks having openings in them and held in the jaws with electrical conductors having tongues to enter the openings in the blocks and engage therewith, and insulating-keys to secure the tongues in place, substantially as described.

5. The combination of an insulating-block having an opening in it and a support for the block with a pair of electrical conductors having tongues to enter said openings and engage with the block, and an insulating-key to enter between the two tongues and secure them in place, substantially as described.

6. The combination of the conduit having ribbed jaws with insulating-blocks grooved at the edges to fit in said jaws and having central openings through them, electrical conductors having tongues to enter said openings, and insulating-keys to secure the tongues in place, substantially as described.

7. The combination of the pair of jaws having a closed outer end with an insulating-block to enter the jaws and having an opening through it, an electrical conductor having a tongue to enter the said opening, a key to secure the tongue in place, and wedges to enter between the closed end of the jaws and the insulating-block, all substantially as described.

8. The combination of a conduit, a number of outgoing conductors and insulating-supports therefor with a common return-wire electrically connected to the conduit, substantially as and for the purpose set forth.

9. The combination of a conduit, an insulating-block having an opening through it, and a support for the block with an electrical conductor having a tongue to secure it in the block, the said tongue being provided with a pin to connect it electrically to the conduit.

In testimony whereof I have signed my name to this specification in the presence of two subscribing witnesses.

JOHN C. LOVE.

Witnesses:
WILLIAM D. CONNOR,
HARRY SMITH.